Sept. 8, 1959 W. E. SMITH 2,903,558
ELECTRIC WELDING METHOD
Filed Sept. 16, 1957

INVENTOR.
WILLIAM E. SMITH
BY Irvin L. Groh
ATTORNEY.

United States Patent Office 2,903,558
Patented Sept. 8, 1959

2,903,558

ELECTRIC WELDING METHOD

William E. Smith, Detroit, Mich., assignor to Midland-Ross Corporation

Application September 16, 1957, Serial No. 684,260

7 Claims. (Cl. 219—74)

This invention relates to electric welding and more particularly to a method of forming a continuous seam for welding layers of metal.

The method of this invention is especially suited for use in the production of box sections such as found in the side rails of automotive vehicle frames. In the formation of box sections, two channel sections are fitted together so that the flanges either abut each other or overlap and a weld is formed along the contacting edges of the flanges of the sections. It is difficult to perform this type of welding automatically because of manufacturing variations in the channel members which cause poor fits when the channels are placed in position relative to each other. For this reason the channel sections are joined together by hand welding and the welds are usually formed intermittently rather than as a continuous seam. This requires the use of relatively heavy channel members to gain the required strength and results in a heavy frame.

It is a general object of this invention to provide a method of welding particularly adapted for welding a continuous seam to join overlapped layers of material in which the fit between the layers is not critical and in which the position of the weld is not dependent on the location of the edge of the metallic members.

It is a further object of the invention to provide a process of welding by which overlapped metallic members may be joined by welding relative to a surface of one of the members as opposed to the edges of the members.

Another object of the invention is to provide a process of welding of the above mentioned type which is particularly adapted to be carried out automatically by machinery as well as manually.

It is still another object of the invention to provide a process by which a box section member, either curved or straight, may be formed from two channel members either manually or automatically, with a minimum of time and without the duplication of equipment such as jigs and fixtures.

More specifically, it is an object of the invention to provide a method of electric welding in which the electrode is positioned horizontally so that electrodes may be disposed at opposite sides of the members to be welded for simultaneous operation.

The foregoing and other objects and advantages are attained by the present invention, various novel features of which will be apparent from the following description and from the accompanying drawings disclosing a preferred embodiment of the invention.

Figure 3:
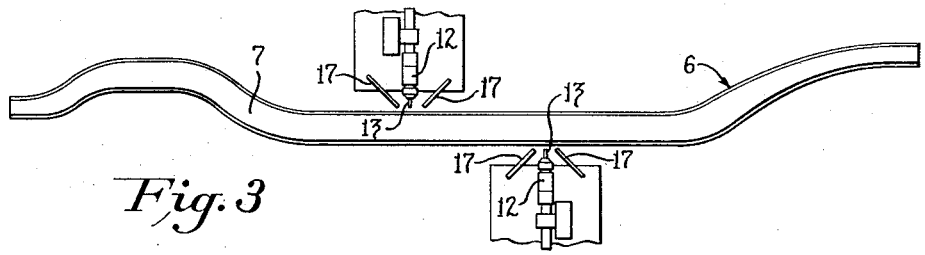
Fig. 3 is a top view of a side rail such as used in automotive vehicle frames in position to be welded with the various components and apparatus in operative relation to each other.

Referring to the drawings showing a preferred manner of carrying out the invention, the numeral 6 designates a piece of work which is to be welded with longitudinally extending, continuous seams. More specifically the piece of work is a box section side rail of an automotive vehicle frame having the usual curved or offset portions as shown in Fig. 3. Although the method of the invention is adapted for welding other articles, the side rail has been selected as an example to illustrate the difficulties which are overcome and the advantages which are gained by the present method.

The side rail 6 is made up of a length of channel section 7 nested within a second channel section 8. The channel section 7 is disposed with its flanges 9 in lapped relation to the flanges 11 of the other section 8 to form a closed box section having lapped joints at opposite sides of the side rail.

Prior to the time that actual welding is begun channel member 7 is placed on top of channel member 8 and the members are clamped and held stationary relative to each other in a horizontal position with the surfaces of the flanges 9 and 11 disposed vertically.

An automatic metallic arc welding head of conventional type which may be moved relative to the seam to be welded is provided with a guide tube 12 through which a fusible welding wire electrode 13 is continuously fed during welding by the usual driven feed rollers on such heads. Electric current having relatively high values of amperage and voltage is conducted to the electrode near its arcing end to obtain the desired penetration required to carry out the present method. Rectified direct current has been found satisfactory for this purpose.

The guide tube 12, and consequently the electrode 13 which is being fed through it, is arranged substantially normal to the joint to be welded. That is, the electrode is disposed at right angles perpendicular to the seam to be formed and in a general horizontal plane. The wire electrode is preferably directed so that the arc formed between the surface of the flange and the electrode end will cut or melt through the flange 11 at a point spaced from the corner edge 16. The cutting of the flange 11 and the melting of the consumable welding wire results in a pool or puddle of metal which extends through the outer flange and penetrates through a portion of the inner flange.

Figure 1:
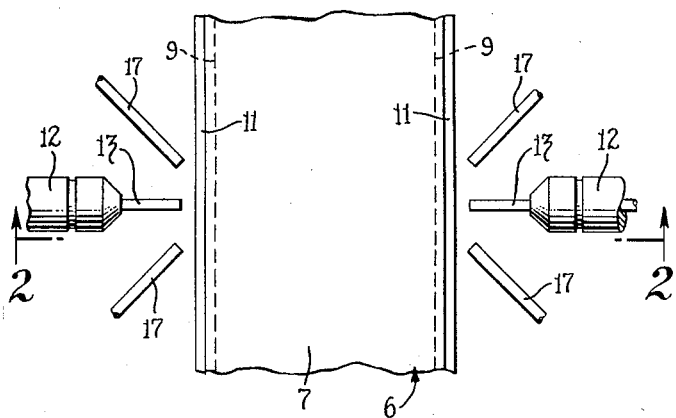
Fig. 1 is a plan view of a seam being welded with the relative arrangement of the various parts of the welding apparatus in operative relation of the work-piece and the seam being welded.

Since the flanges of the channels are disposed vertically, the molten metal must be held in position until it solidifies to avoid flow from the area of the seam. This is accomplished by directing streams of gas at a controlled rate on the molten seam and as seen in Fig. 1 is accomplished by positioning tubes 17 at opposite sides of the electrode 13 to move with the welding head. The tubes converge relative to each other so that gas fed through the tubes is directed on the metal as it is melted by the arc. The tubes are connected to a supply of gas in any conventional manner and the rate of discharge through the tubes is controlled by adjustable valves. The discharging gas is effective to maintain the molten metal in position and to facilitate its cooling so that it solidifies in the desired position to form a weld 18. In addition, the gas used may be of a type to provide an atmosphere in the area of the arc effective to prevent oxidation.

It has been found that in this method of welding it is desirable to use relatively more electrical power and to discharge the gas at relatively higher pressures than would be necessary if the same type of weld were formed in a normal downhand position. For example, it has been found that in welding together channel members of approximately .070 to .090 inch in thickness with a one-sixteenth diameter electrode, approximately 32 volts and 800 amperes are satisfactory when the electrode is moved at a rate of approximately 250 inches per minute. With this power and this speed it has been found that the electrode will melt through the flange 11 or an outer layer of material and penetrate into the flange 9 or inner layer of material so that the molten metal formed by the melted portions of the flanges and the consumable electrode 13 solidifies to form a continuously welded seam 18.

Figure 2:
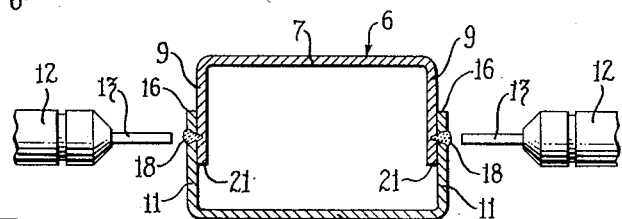
Fig. 2 is a transverse section taken generally on line 2—2 in Fig. 1.
Figure 4:
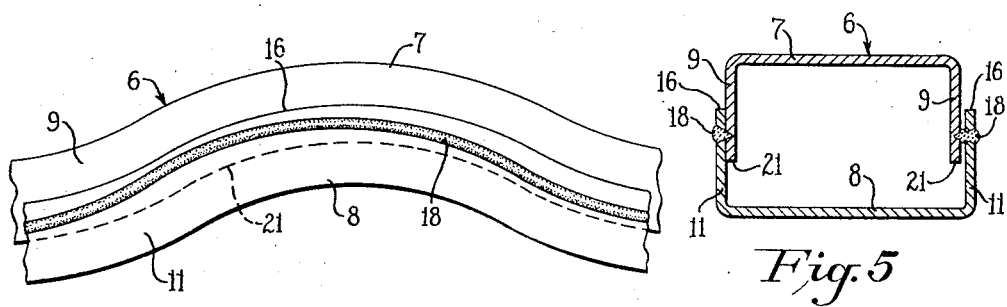
Fig. 4 is a side view of a curved work-piece illustrating the position of the welded seam.

Although only the relationship of the electrode and the directing of the gas streams has been described with relation to the weld to be formed, it will be apparent that a machine could be readily constructed to form the weld automatically. For example, in forming a continuous fillet weld on a box section of the type illustrated in Fig. 2 between one of the edges 16 and the associated flange 9, the welding head must be guided not only relative to the surface to be welded but also relative to the edge 16 of the channel. Both of these relations are critical but the latter is extremely difficult to maintain. In the present system, however, it is merely necessary to guide the electrode so that a proper horizontal spacing is maintained between the surface of the outer one of the flanges and the end of the electrode. This is easily accomplished by methods well known in the welding machine art. As best seen in Fig. 4, the vertical position of the end of the electrode is not critical since it is merely necessary to maintain an arc in the area of the overlapped seam formed by flanges 9 and 11, that is, between horizontal planes passing through the edges 16 and 21. This may be accomplished by guiding the welding head relative to a template having a vertical configuration conforming generally to the seam desired. Manufacturing variations in the flanges will consequently have no adverse effect on the welding.

Figure 5:
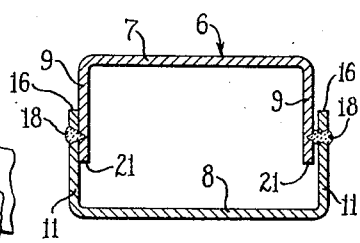
Fig. 5 is a view similar to Fig. 2 but showing a different relationship of the parts.

It has also been found that an efficient, strong weld may be formed between layers of material even though the interfaces of the material are spaced apart as much as two-thirds the thickness of the metal being welded. The resulting seam 18 is illustrated at the right in Fig. 5. This is of particular importance when the layers of material to be welded are curved or offset because it is frequently difficult, or at least expensive, to maintain perfect fits.

Because of the ease in controlling the position of the welded seam and because an efficient seam is formed despite spaces between the layers to be welded, the present method is well adapted to the formation of continuous seams. This results in stronger structures than are obtained with conventional practices in which a weld is formed between the edge of one layer and the surface of another. Ordinarily such welds are formed manually at spaced intervals. It has been found that the strength of an automobile frame welded in this manner and having a metal thickness of .092 inch can be equaled by using the present method and reducing the metal thickness to approximately .075 inch. This results not only in a considerable reduction in cost but also in a reduction in weight which is of great importance to the automobile manufacturer.

By using the present method with a pair of welding heads at opposite sides of the members to be welded together, it is possible not only to speed production but also to form box sections which are offset or curved over their entire length without the requirement of separate tools and fixtures for each seam. When welds are formed in the downhand position, that is, with the electrode positioned generally vertically, the first seam is formed with the work held in one set of fixtures and the work is moved to a second and different set of fixtures to form the second seam. This is not only costly but time consuming. In the present method, the channel members are placed in the proper relation to each other and are held by a single set of fixtures. As seen in Fig. 3, seams are formed simultaneously at opposite sides of the work-piece by a pair of identical welding heads having their electrode wires positioned horizontally. This may be referred to as positioning the electrodes at 3 and 9 o'clock. The welding heads may be moved in opposite directions or in the same direction so that the seams at opposite sides of the side rail are completed at approximately the same time. This completes the required welding and the work-piece is ready for removal from the positioning fixture.

Although the present method has been described in connection with the formation of a weld between a pair of members, it has been found that welded seams may be formed by each welding head and its associated apparatus between three or more layers of material. When this is done the arc must penetrate to melt through a portion of the last or innermost layer and completely through all the other layers.

By way of summary, a preferred form of the present method will be described in connection with the fabrication of an automobile side frame member made up of a pair of channel members having a thickness of approximately .075 inch. One of the channel members is positioned with its flanges extending upwardly and the other channel member is placed on top of the first member with its flanges extending downwardly so that corresponding flanges are overlapped with each other. The amount of flange material provided to form the overlap will depend on such factors as the amount of material required to afford desired strength characteristics of the side rail or on the degree to which vertical movement of the welding head is to be controlled. At the minimum, the overlapped portion will be slightly wider than the width of the weld. After the channel members are properly positioned relative to each other, they may be fixed in position and the welding heads may be positioned with the electrodes disposed horizontally for movement longitudinally of the side frame in horizontally spaced relation to the surfaces of the outermost layers or flanges 11. An intense arc is formed between the end of the electrode 13 and the workpiece so that the outer layer 11 and a portion of the inner layer 9 are melted. Simultaneously with the movement of the welding heads and the formation of the arcs, streams of gas are directed on the molten seams to hold them in position until solidified. At the completion of the welding, the unitary side rail may be removed from its welding position.

It will be seen that the present invention affords a method for forming a continuous weld between layers of material which is not dependent on the position of the edges of the material but which may be formed at a location spaced from the edge of the material. Furthermore, the weld may be formed with the electrode in a horizontal position which facilitates simultaneous welding at opposite sides of a piece of work. In addition, the weld may be formed even though the layers of material are not in contact with each other.

It should be understood that it is not intended to limit the invention to the above described forms and details, and that the invention includes such other forms and modifications as are embraced by the scope of the appended claims.

It is claimed and desired to secure by Letters Patent:

1. The method of electric welding a pair of members positioned with portions in overlapped relation to each other with said overlapped portion extending generally horizontally with the interfaces of said members disposed vertically, the step comprising creating an arc between a horizontally disposed consumable electrode and the outer one of said layers in the area of said overlapped portion between the edge of the last mentioned layer and the edge of the other of said layers, said arc being of sufficient intensity to melt through said outer layer and at least a portion of the other layer to form a molten seam of metal, and simultaneously directing a gas against said molten seam at a pressure sufficient to create a force to maintain said molten seam in position until solidified.

2. The method of forming a weld between overlapped metallic members comprising positioning said members with at least portions adjacent the edges of said members in overlapped relation with the interfaces of said members disposed vertically and the edges of said members in the overlapped area disposed generally horizontally, moving an electrode disposed perpendicular to the surface of the member nearest said electrode in a path between said edges and uniformly spaced from said last mentioned member, forming an arc between said electrode and said members, said arc being of sufficient intensity to melt through the outermost layer and at least a portion of the innermost layer to form a molten pool of metal, and directing a stream of coolant gas on said molten pool of metal at a pressure sufficient to maintain said pool in position until solidified.

3. The method of electric arc welding generally flat metallic members comprising positioning said members with portions extending inwardly from the edges of said members in adjacent relation to form an overlapped portion of a width in excess of the width of the weld to be formed and with the facing surfaces of said members disposed vertically, positioning an electrode horizontally and moving it at right angles to said overlapped portion in a path uniformly spaced from said overlapped portion and varying vertically between horizontal planes passing through said edges, forming an intense arc during movement of said electrode between said electrode and said overlapped portion to melt through said portion to a depth less than the thickness of said overlapped portion to form a molten seam of metal, and simultaneously directing a stream of gas toward said seam to hold said metal in position between the unmelted part of said overlapped portion and said stream of gas until said molten metal solidifies.

4. A method of welding together a pair of generally channel shaped sections to form a box section in which the flanges of the channel sections are overlapped to form seams, the steps including positioning electrodes perpendicular to the outer flanges at opposite sides of the box section, forming arcs between said electrodes and said outer flanges of sufficient intensity to melt through the outer flanges and a portion of the associated inner flanges to form pools of fluid metal, moving said electrodes simultaneously in the direction of the seams formed by said overlapped flanges, and directing continuous streams of gas against said fluid pools to prevent flow thereof until solidified.

5. The method of welding together a pair of channel members to form an elongated member having a box-like cross section comprising positioning said channel members with portions of the flanges in overlapped adjacent relation to form a pair of longitudinally extending overlapped seams having a width greater than the weld to be formed, positioning consumable electrodes perpendicular to the surfaces of the associated seams, creating an electric arc between the ends of each electrode and the surface of the corresponding seam, said arcs being of sufficient intensity to penetrate to a depth slightly less than the thickness of said seams and less than the thickness of one of said channel members to form pools of flowable metal, moving the electrodes to maintain their ends in predetermined spaced relation from the surface and within the boundaries of the overlapped seam, and directing streams of gas on said pools to maintain them in position within the boundaries of said seam until cooled to a non-flowing state.

6. A method of making an elongated, generally tubular metallic member comprising positioning a pair of generally channel shaped members in a horizontal position with one channel member on top of the other and with edge portions of one of said channel members in overlapped adjacent relation to corresponding edge portions of the other of said channel members, directing consumable electrodes simultaneously to opposite sides of said channel members in the zone of said overlapped portions and spaced from the edges of the outer ones of said channel shaped members, establishing arcs between each of said electrodes and said members to melt through the outer portions of said members and through at least a part of the inner portions of said members to create molten pools of metal, directing an inert gas under relatively high pressure to the area of said arcs to hold said molten pools and solidify them in position whereby welds will be formed simultaneously at opposite sides of said tubular member and between the interfaces of said overlapped portions.

7. The method of producing a continuous weld between layers of metallic members comprising, placing said members with portions in surface facing relation to each other to present a seam having a width greater than the width of the weld to be formed, positioning a consumable electrode horizontally and perpendicular to the outer surface of one of said members, moving said electrode and said seam relative to each other while maintaining said electrode within the area of said seam, applying a relatively high current to form an intense arc between the electrode and said seam during said relative movement for melting through said one member and through a portion of the other member to form a molten pool of metal, and simultaneously directing a stream of gas adjacent the arc and on said molten seam at a rate in excess of that required to provide a non-oxidizing atmosphere for said arc and at a pressure to maintain the molten metal in position until solidified.

References Cited in the file of this patent
UNITED STATES PATENTS

| | | |
|---|---|---|
| 1,831,343 | Caldwell | Nov. 10, 1931 |
| 2,288,032 | Smith | June 30, 1942 |
| 2,315,358 | Smith | Mar. 31, 1943 |